United States Patent [19]

Drew et al.

[11] Patent Number: 5,253,972
[45] Date of Patent: Oct. 19, 1993

[54] ROLL DOLLY

[75] Inventors: Wilbur Drew, Dover; Ross A. Freeman, Somersworth, both of N.H.

[73] Assignee: Moore Business Forms, Inc., Grand Island, N.Y.

[21] Appl. No.: 827,210

[22] Filed: Jan. 30, 1992

[51] Int. Cl.$^5$ ............................................. B65G 7/00
[52] U.S. Cl. ................................ 414/469; 414/428; 414/908; 414/911; 280/43.12
[58] Field of Search ............. 414/426, 427, 428, 469, 414/910, 911, 908; 280/43.12, 79.4, 79.6

[56] References Cited

U.S. PATENT DOCUMENTS

| | | | |
|---|---|---|---|
| 1,536,611 | 5/1925 | Duke | 414/469 |
| 1,587,842 | 6/1926 | Knox | 414/911 X |
| 2,326,684 | 8/1943 | Ross | 414/427 |
| 2,452,481 | 10/1948 | Morehead et al. | 414/428 |
| 2,477,871 | 8/1949 | Grogan et al. | 414/911 X |
| 4,091,942 | 5/1978 | Shelton | 280/47.2 X |
| 4,240,773 | 12/1980 | Terry | 414/911 X |
| 4,762,333 | 8/1988 | Mortenson | 280/47.21 X |
| 4,771,531 | 9/1988 | Asher | 414/428 X |
| 5,052,877 | 10/1991 | Jääskeläinen et al. | 414/911 X |

FOREIGN PATENT DOCUMENTS

| | | | |
|---|---|---|---|
| 3336836 | 5/1985 | Fed. Rep. of Germany | 414/911 |
| 2201129 | 8/1988 | United Kingdom | 414/911 |
| 2231026 | 11/1990 | United Kingdom | 414/911 |

Primary Examiner—Michael S. Huppert
Assistant Examiner—Stephen T. Gordon
Attorney, Agent, or Firm—Nixon & Vanderhye

[57] ABSTRACT

A specially constructed pallet jack is used for transporting a heavy roll of paper having a central hollow core. The pallet jack includes a frame with elongated arms having first and second ends, with a first set of wheels mounted at the second end of the arms, and a second set of wheels mounted near the first end of the arms. A jack is provided for jacking up the first ends of the arms so that they are spaced from the wheels. Between the arms is a cradle having first and second ends with three obtuse angle-connected planar surfaces extending between the first and second ends. The first end of the cradle is pivotally mounted to the first ends of the arms, and the cradle is biased to a roll-receiving position by a gas spring. When a roll is rolled into the cradle, it pivots, dampened by shock absorbers to a roll-capture position in which the roll cannot spontaneously roll out of the cradle. A strap passes from the cradle through the core of the roll to positively hold it in place.

20 Claims, 4 Drawing Sheets

ROLL DOLLY

BACKGROUND AND SUMMARY OF THE INVENTION

In many different installations, such as printing plants, textile plants, etc., it is necessary to transport large rolls of web material from one station to another. For example, in printing plants, it is necessary to transport rolls of paper from receiving pallets to the printing presses. Such rolls usually weigh more than 100 pounds, typically several-hundred pounds, and often are desirably transported individually, rather than in groups (i.e., with a fork lift). Therefore, it is desirable to provide a piece of equipment that allows one worker to easily, yet safely, transport a roll from one position to another.

According to the present invention a mechanism, and method, are provided which allow a single worker to easily, yet safely, transport rolls of webbed material weighing more than 100 pounds from one location to another. According to one aspect of the present invention, a pallet jack is provided for capturing and transporting a roll. The pallet comprises: A frame including first and second elongated in a first dimension, substantially parallel support arms spaced from each other in a second dimension generally transverse to the first dimension; the arms having first and second ends. First wheel means operatively mounted to the frame adjacent the second ends of the arms. A handle mounted to the frame adjacent the first wheel means. Second wheel means operatively mounted to the frame adjacent the first ends of the arms. Jack means for moving the second wheel means toward and away from the arms to elevate the arms when moved away from the arms. And, means for receiving a roll between the arms, the roll-receiving means comprising a cradle pivotally mounted to the arms and biasing means for biasing the cradle to a predetermined position with respect to the arms.

The cradle has a first end and a second end, the second end being closer to the handle than the first end. The cradle is pivotally mounted to the arms adjacent the first end thereof about a generally horizontal axis. The cradle has a roll-engaging surface and sidewalls extending upwardly from the roll-engaging surface. Preferably, the roll-engaging surface comprises first, second and third adjacent substantially planar surface portions, each making an obtuse angle with respect to one or more adjacent surface portions, the first surface portion adjacent the first end and the third surface portion adjacent the second end of the cradle. Also, at least one shock absorber is preferably mounted between the arms and the second end of the cradle to dampen movement of the cradle under the heavy weight of the roll.

The biasing means may comprise a gas spring mounted between the arms and the second end of the cradle for biasing the cradle second end toward a position in which the first surface portion thereof slopes upwardly in a direction from the second end toward the first end of the cradle. Also typically stop means are provided for stopping pivotal movement of the second end of the cradle against the bias of the biasing means after a predetermined amount of travel (e.g., after the cradle has pivoted roughly about 10° to 15° about its axis). Preferably, the cradle, arms, and biasing means are dimensioned and positioned so that when a roll of designed configuration is received by the cradle and the jack means elevates the arms, the first planar surface slopes downwardly in a direction extending from the first end of the cradle to the second end thereof. Also strap means are preferably provided mounted to the cradle sidewalls for strapping a roll to the cradle.

According to another aspect of the present invention, a roll-transporting mechanism is provided. The roll-transporting mechanism comprises the following elements: A frame including first and second substantially parallel support arms elongated in a first dimension and spaced from each other in a second dimension generally transverse to the first dimension, the arms having first and second ends. Wheel means operatively mounted to the frame for facilitating wheeled transport thereof. And means for receiving a roll between the arms, the roll receiving means comprising a rigid cradle pivotally mounted to the arms. The cradle has a first end and a second end, the second end of the cradle being closer to the arms second ends than the first end of the cradle is, and the cradle is pivotally mounted to the arms adjacent the first end thereof about a generally horizontal axis.

The invention also contemplates a method of transporting a roll of web (e.g., paper) material having a central hollow core and a weight of more than 100 pounds. The method comprises the steps of: (a) Ensuring that the jack has jacked up both ends of the arms. (b) Wheeling the mechanism into operative association with a roll of web material so that the roll is at the entry end of the cradle. (c) Rolling the roll into the cradle with the hollow core of the roll horizontal, the weight of the roll causing the cradle to pivot to a position in which the roll cannot spontaneously roll back out the entry end of the cradle. (d) Wheeling the mechanism to a position where the roll is desirably to be placed. (e) Lowering the arms to floor level allowing the cradle to pivot forward to a position in which the roll can be removed. And, (f) rolling the roll out of the cradle at the desired position.

The method according to the invention also preferably comprises the further step, between steps (c) and (d), of strapping the roll to the cradle by passing a strap attached to the cradle through core of the roll, and the still further step, prior to step (f), of unstrapping the roll. The method also preferably comprises the further step, between steps (d) and (e), of jacking down the arms so that they are in a substantially horizontal plane. In the practice of the method, the arms may be in a substantially horizontal plane during the practice of step (c).

It is the primary object of the present invention to provide a mechanism and method for easily and safely transporting a heavy roll within an industrial environment. This and other objects of the invention will become clear from an inspection of the detailed description of the invention and from the appended claims.

DETAILED DESCRIPTION OF THE DRAWINGS

Figure 1:
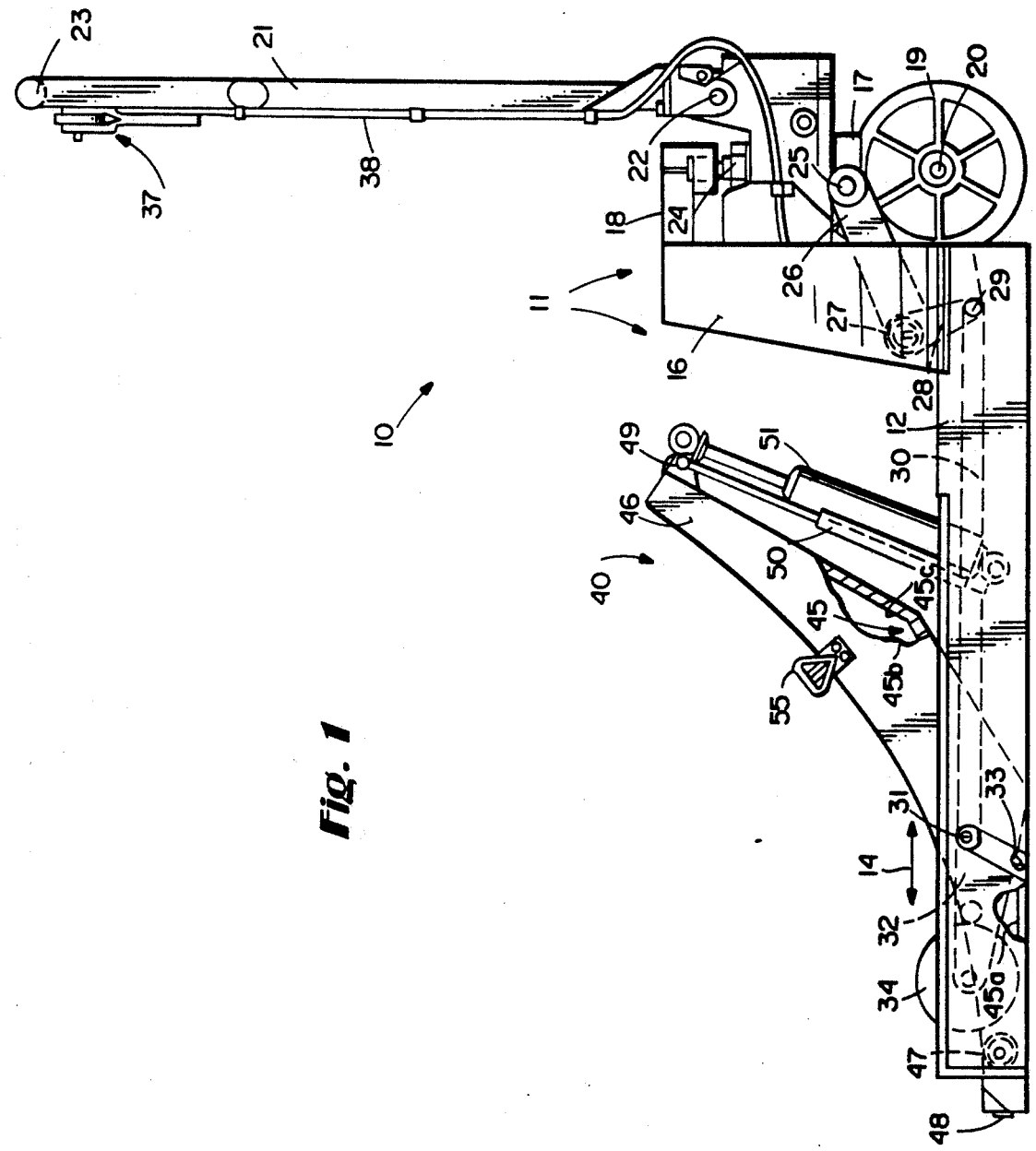
FIG. 1 is a side view of an exemplary roll-transporting mechanism according to the invention in a position ready to receive a roll.

An exemplary roll-transporting mechanism, comprising a modified form of a pallet jack, according to the invention is illustrated generally by reference numeral 10 in the drawings. A number of components of the mechanism 10 are the same as or equivalent to components in conventional pallet jacks, with the mechanism 10 being specially modified so as to easily and safely transport a heavy roll of web material.

The mechanism 10 includes a frame 11, including first and second arms 12, 13, elongated in a first dimension 14. The arms 12, 13 are substantially parallel to each other and are spaced from each other in a second dimension 15 (see FIG. 3), generally transverse to the first dimension 14. The arms 12, 13 have first and second ends, being connected at the second ends thereof to a main frame component 16, with the first ends thereof (most remote from the main frame component 16) being free. The frame 11 also comprises a rear component 17 connected to the main component 16 and extending rearwardly therefrom, and a top flange 18 connected to the top of, and extending rearwardly from, the main frame component 16.

The mechanism 10 also comprises first wheel means 19, which preferably comprise a pair of wheels (only one of which can be seen in FIGS. 1 and 2) mounted for rotation on a common axle 20, the axle 20 being generally horizontal. The mechanism 10 also comprises a handle 21, pivotally mounted at pivot pin 22 thereof to the frame component 17, and having a top portion 23 for grasping by operator's hands.

The mechanism 10 also includes a jack means, typically comprising a hydraulic piston 24 mounted between the flange 18 and the pivotal connection 25 of the bell crank arm 26. Piston 24 is actuated by pivoting the handle 21 about the pivot pin 22 in an up and down fashion to effect "jacking", as is conventional in pallet jacks.

The bell crank arm 26 is pivotally mounted by shaft 27 for rotation about a horizontal axis, and the lever 28 connected thereto is mounted at pivot 29 to a straight lever 30 disposed within the arm 12. The straight lever 30 is connected by pivot pin 31 to another lever 32 which, is pivoted about shaft 33 connected to the arm 12. At the end of the lever 32 remote from the pivot pin 31 is a wheel 34 comprising part of a second wheel means. Note that the structures 26, 30, 32, 34, etc., are repeated for the other side of the mechanism 10, and designated with a "1" associated with the arm 13, the wheel 34' being in FIG. 3. When the piston 24 is elongated by the "jacking" action with handle 21, the levers 26, 32, etc., are pivoted from the position illustrated in FIG. 1 to the position illustrated in FIG. 2, so that the free ends of the arms 12, 13 are elevated with respect to the second wheel means 34, 34', the position illustrated in FIG. 2 being a transport position.

A conventional handbrake handle 37, connected by a bowden cable 38, operates a commercial automotive handbrake (not shown) to hold wheel means 19 in place.

What has been described so far is essentially conventional in commercial pallet jacks. What will be described now is the particular cradle 40, and associated components, according to the invention that adapt the use of the pallet jack to easily and safely transport a heavy roll 41 (see FIG. 4) such as a roll of web material like paper or cloth, having a central hollow core 42, and a predetermined width 43.

The cradle 40 has a roll-engaging surface 45, which typically is constructed of first, second and third adjacent substantially planar surface portions 45a, 45b and 45c, each makes an obtuse angle with respect to one or more adjacent surface portions (e.g., first portion 45a making an obtuse angle with respect to the second portion 45b, and the second portion 45b an obtuse angle with respect to both first and third surface portions 45a and 45c). The cradle 40 also preferably comprises sidewalls 46, 46' (see FIGS. 1 and 3) extending upwardly from the surface 45, the walls 46, 46'—when provided—being spaced from each other in the dimension 15 a distance slightly greater than the width 43 of a typical roll 41 to be transported thereby.

Figure 3:
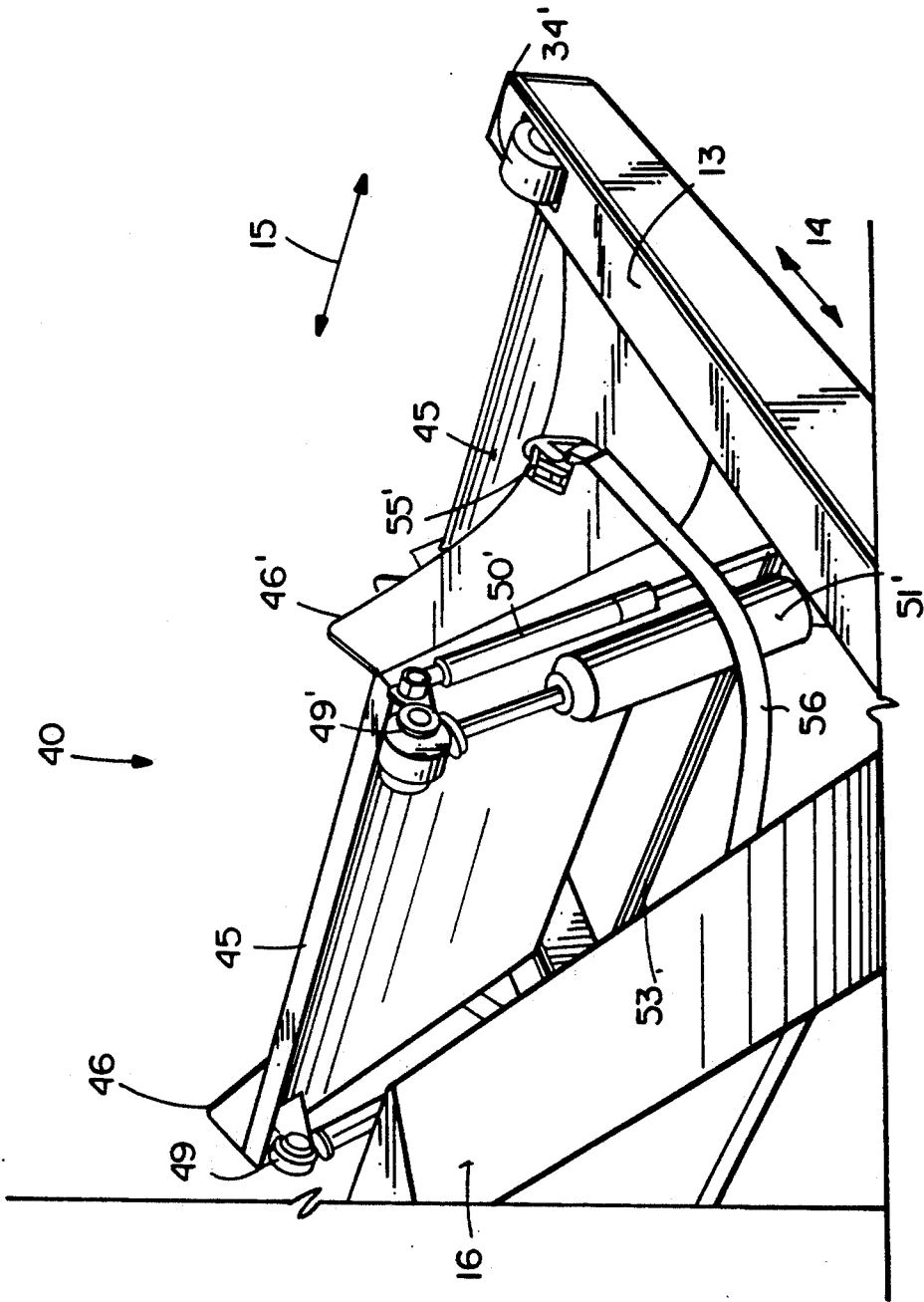
FIG. 3 is a rear detail perspective view of the mechanism of FIGS. 1 and 2 primarily illustrating the cradle.

The cradle 40 is pivotally mounted adjacent the front, leading, entry end 48 thereof by pivot pins 47 which are adjacent the free ends of arms 12, 13. The pivot pins 47 are received in the walls 46, 46', as well as the arms 12, 13. At the second end of the cradle 40, closer to the handle 21 and main frame 16 than the entry end 48 thereof, flanges are provided. Preferably, a pair of brackets 49 and 49' are provided one adjacent each sidewall 46, 46'—as clearly seen in FIG. 3—at the second end of the cradle 40. A biasing means, such as gas spring 50 (see FIG. 1) is connected between the bracket 49 and the arm 12 (with another 50' provided between the arm 13 and bracket 49' if desired, as seen in FIG. 3) for biasing the cradle 40 to the position illustrated in FIG. 1 so that it is in a good entry position for receipt of a roll. A shock absorber 51, 51' is associated with each of the brackets 49, 49', too, to dampen the movement of the cradle surface 45 about the pivot pins 47 when the heavy roll 41 is moved into the cradle 40. The shock absorbers 51, 51', may be conventional automobile shock absorbers such as those sold under the trademark "MONROE LOAD LEVELER".

Figure 2:
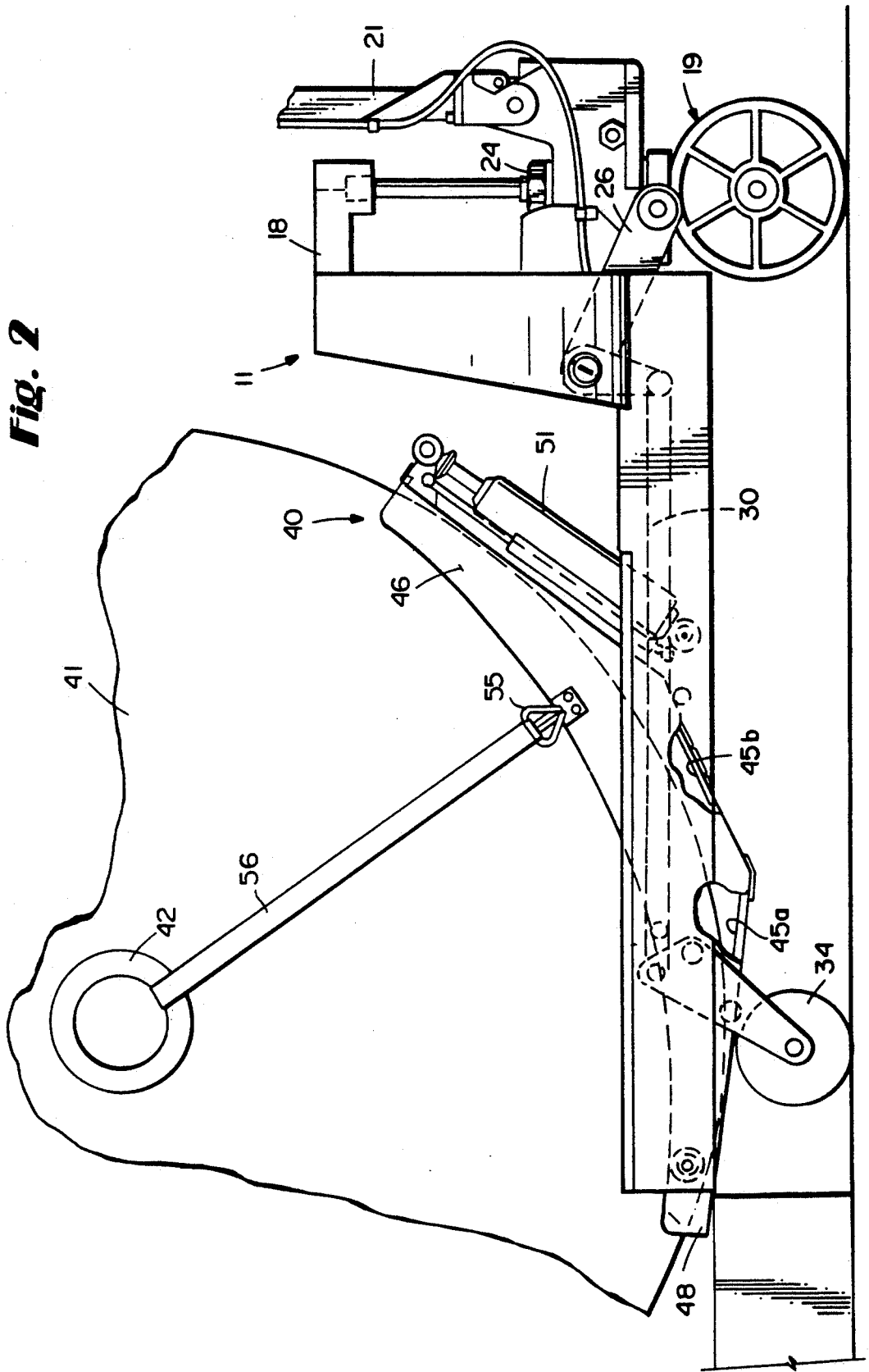
FIG. 2 is a view like that of FIG. 1, with portions cut away for clarity of illustration, showing the cradle in the transporting position it assumes, receiving a heavy roll therein.

The cradle 40 also preferably comprises stop means for stopping pivotal movement about the pivot pins 47 at the position illustrated in FIG. 2. The stop means may be a stop bar 53 (see FIG. 3) attached to and extending between the arms 12, 13, in the dimension 15, or stopping action may be provided by the shock absorbers 51, 51' reaching an end of travel position.

Typically, the components of the cradle 40 are arranged so that the cradle surface 45 will pivot about the pivot pins 47 from the entry position (FIG. 1) to which it is biased by the gas spring 50, to the stop position illustrated in FIG. 2, roughly about 10° to 15°. Also, the components of the jack means 24, etc., cradle 40, and biasing means 50, 50' are dimensioned and constructed so that when the mechanism 10 is in the roll transporting position of FIG. 2, the first planar surface 45a thereof slopes downwardly slightly from the entry end 48 toward the brackets 49, 49' so that a roll 41 may not spontaneously roll out of the entry end 48 of the cradle 40. However, in order to ensure safe transport of the roll 41, this cradling action is not relied upon exclusively, but rather, the roll 41 is also strapped in place.

An exemplary mechanism for strapping the roll in place includes the strap buckles 55, 55' (see FIGS. 1 and 3) provided at central locations at the opposite rigid sidewalls 46, 46' of the cradle 40, with a nylon or like material strap 56 (see FIGS. 3 and 4) extending between them. The strap 56 will be passed through the hollow core 42 of the roll 41 and operatively connected to both of the buckle mechanisms 55, 55'. The exact connections to the buckle mechanisms 55, 55', are not important, any conventional fastening mechanism for securely holding the strap 56 to the mechanisms 55, 55' being all that is necessary.

An exemplary method of transporting a roll 41 utilizing a mechanism 10 will now be set forth. The method is exemplary only. There are many modifications that may be made thereof.

Assuming that the roll 41 is initially on the ground, mechanism 10 is wheeled up to the roll 41 and the leading end 48 of the cradle 40 is placed on the ground immediately adjacent the roll 41, with the components of the mechanism 10 in the relative positions illustrated in FIG. 1. The conventional handbrake lever 37, connected by the bowden cable 38 to a conventional automotive style handbrake (not shown), locks the wheels 19, so that the mechanism 10 will not move, then the worker rolls the roll 41 onto the cradle 40. Either the strap 56 can be attached to buckles 55, 55' at this time, or the handle 21 "pumped" so that the levers 26, 30, 32, are moved to "jack up" the arms 12, 13 to the position illustrated in FIG. 2. With the components in the position of FIG. 2, the roll 41 on the cradle 40 will cause the surface 45 to pivot about the pivot pins 47 against the bias of gas springs 50, 50' and dampened by the shock absorbers 51, 51', to a stop position (e.g., engaging bar 53). In the stop position (FIG. 2), the surface portion 45a slants slightly downwardly from the front end 48 of the cradle toward the brackets 49, 49' at the rear end there.

Figure 4:
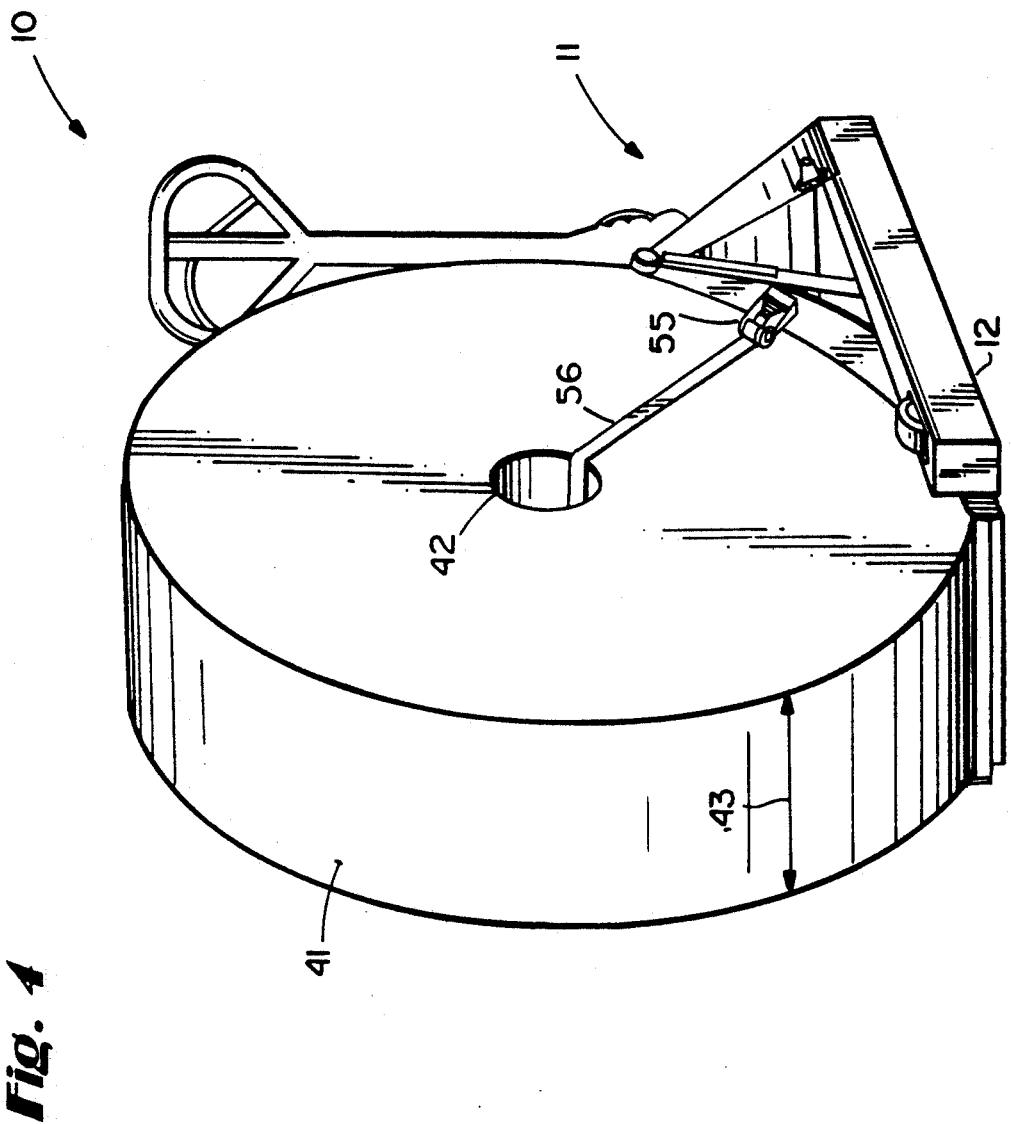
FIG. 4 is a front perspective view showing the mechanism of FIGS. 1 through 3 with a roll actually being mounted therein, ready for discharge.

With the roll 41 positioned as illustrated in FIG. 4, but with the mechanism 10 "jacked up" as illustrated in FIG. 2, the mechanism 10 is then wheeled to a position where the roll is desirably placed. Then the arms 12 13 are "jacked down" so that the mechanism 10 has the configuration illustrated in FIG. 4, the strap 56 is removed and the roll 41 is rolled out of the cradle 40.

If the roll 41 is originally on a pallet (illustrated at the left end of FIG. 2), then with the arms 12, 13 in the position illustrated in FIG. 2, the mechanism 10 is wheeled into place next to the pallet with the entry end 48 of the cradle 40 right next to the roll 41. In this position, the surface portion 45a remains roughly parallel to the floor. When the roll 41 is rolled onto the cradle 40, then the surface 45 pivots to the position illustrated in FIG. 2.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A roll jack for capturing and transporting a roll, comprising:
    a frame including first and second elongated in a first dimension, substantially parallel, support arms spaced from each other in a second dimension generally transverse to the first dimension; said arms having first and second ends;
    first wheel means operatively mounted to said frame adjacent said second ends of said arms;
    a handle mounted to said frame adjacent said first wheel means for effecting ready movement of the frame;
    second wheel means operatively mounted to said frame adjacent said first ends of said arms;
    jack means for moving said second wheel means toward and away from said arms to elevate said arms when moved away from said arms, and to cause said second wheel means to move from a first position not supporting said arms to a second position supporting and elevating said arms; and
    means for receiving a roll between said arms, said roll receiving means comprising a cradle pivotally mounted to said arms and biasing means for biasing said cradle to a predetermined position with respect to said arms while allowing movement from that predetermined position against the bias of said biasing means.

2. A jack as recited in claim 1 wherein said cradle has a first end and a second end, said second end being closer to said handle than said first end; and wherein said cradle is pivotally mounted to and between said arms about a generally horizontal axis, adjacent said first ends of said arms between said second wheel means and said first ends of said arms.

3. A jack as recited in claim 2 wherein said cradle has a roll engaging surface and side walls extending upwardly from said roll engaging surface.

4. A jack as recited in claim 3 wherein said roll engaging surface comprises first, second, and third adjacent substantially planar surface portions, each making an obtuse angle with respect to one or more adjacent surface portions, said first surface portion adjacent said second end of said cradle, of said cradle.

5. A jack as recited in claim 1 further comprising at least one shock absorber mounted between said arms and said cradle.

6. A pallet jack as recited in claim 4 wherein said biasing means comprises at least one gas spring mounted between said arms and said second end of said cradle for biasing said cradle second end toward a position in which said first surface portion thereof slopes downwardly in a direction from said first end toward said second end of said cradle.

7. A pallet jack as recited in claim 2 further comprising stop means for stopping pivotal movement of said second end of said cradle against the bias of said biasing means after a predetermined amount of travel.

8. A pallet jack as recited in claim 7 wherein said stop means comprises means for stopping pivotal movement of said second end of said cradle after it has pivoted roughly about 10°–15° degrees about its axis.

9. A jack as recited in claim 6 where in said cradle, arms, and biasing means are dimensioned and positioned so that when a roll is received by said cradle and said jack means elevates said arms said first planar surface slopes downwardly in a direction extending from said first end of said cradle to said second end thereof.

10. A jack as recited in claim 9 further comprising strap means mounted to said cradle side walls for strapping a roll to said cradle.

11. A pallet jack as recited in claim 1 further comprising strap means mounted to said cradle side walls for strapping a roll to said cradle.

12. A roll transporting mechanism, comprising
    a frame including first and second substantially parallel support arms elongated in a first dimension, and spaced from each other in a second dimension generally transverse to the first dimension; said arms having first and second ends;

wheel means operatively mounted to said frame for facilitating wheeled transport thereof;

means for receiving a roll between said arms, said roll receiving means comprising a rigid cradle pivotally mounted to and between said arms; said cradle having a first end and a second end, said second end of said cradle being closer to said arms second ends than said first end of said cradle is; and said cradle being pivotally mounted to said arms about a generally horizontal axis, adjacent said first ends of said arms between said wheel means and said first ends and said arms; and at least one shock absorber mounted between said arms and said second end of said cradle.

13. A mechanism as recited in claim 12 wherein said cradle has a roll engaging surface and rigid side Walls extending upwardly from said roll engaging surface.

14. A mechanism as recited in claim 13 wherein said roll engaging surface comprises first, second, and third adjacent substantially planar surface portions, each making an obtuse angle with respect to one or more adjacent surface portion, said first surface portion adjacent said first end of said cradle, and said third surface portion adjacent said second end of said cradle.

15. A mechanism as recited in claim 12 further comprising biasing means mounted between said arms and said second end of said cradle for biasing said cradle to a position in which said second end thereof is higher than said first end of said cradle.

16. A mechanism as recited in claim 15 further comprising stop means for stopping pivotal movement of said second end of said cradle against said biasing means after a predetermined amount of travel.

17. A mechanism as recited in claim 13 further comprising strap means mounted to said cradle side walls for strapping a roll to said cradle.

18. A method of transporting a roll of web material having a central hollow core and a weight of more than one hundred pounds using a transporting mechanism having a pair of spaced wheeled arms with a cradle pivotally mounted between the arms and having an entry end, and a jack for jacking one end of the arms upwardly, comprising the steps of:

(a) ensuring that the jack has jacked up the arms;

(b) wheeling the mechanism into operative association with a roll of web material so that the roll is at the entry end of the cradle;

(c) rolling the roll into the cradle with the hollow core of the roll horizontal, the weight of the roll causing the cradle to pivot to a position in which the roll cannot spontaneously roll back out the entry end of the cradle;

(d) wheeling the mechanism to a position where the roll is desirably to be placed;

(e) lowering the arms to roughly floor level, allowing the cradle to pivot forward to a position in which the roll can be removed; and (f) rolling the roll out of the cradle at the desired position.

19. A method as recited in claim 18 comprising a further step, between steps (c) and (d), of strapping the roll to the cradle by passing a strap attached to the cradle through the core of the roll, and a still further step, prior to step (f), of unstrapping the roll.

20. A method as recited in claim 18 wherein the arms are substantially in a horizontal plane during the practice of step (c), and wherein step (a) is practiced by jacking up one end of the arms.

* * * * *